US011941270B2

(12) United States Patent
Yang

(10) Patent No.: US 11,941,270 B2
(45) Date of Patent: Mar. 26, 2024

(54) DATA STORAGE DEVICE WITH DIE-BASED ENHANCED THERMAL MANAGEMENT

(71) Applicant: Western Digital Technologies, Inc., San Jose, CA (US)

(72) Inventor: Niles Yang, Mountain View, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 73 days.

(21) Appl. No.: 17/713,126

(22) Filed: Apr. 4, 2022

(65) Prior Publication Data

US 2023/0315314 A1 Oct. 5, 2023

(51) Int. Cl.
*G06F 3/06* (2006.01)

(52) U.S. Cl.
CPC .......... *G06F 3/0634* (2013.01); *G06F 3/0604* (2013.01); *G06F 3/0653* (2013.01); *G06F 3/0679* (2013.01)

(58) Field of Classification Search
CPC .... G06F 3/0634; G06F 3/0604; G06F 3/0653; G06F 3/0679
See application file for complete search history.

(56) References Cited

U.S. PATENT DOCUMENTS

| 7,590,473 | B2 | 9/2009 | Wyatt |
| 9,811,267 | B1* | 11/2017 | Yang ...................... G11C 16/26 |
| 10,331,377 | B2 | 6/2019 | Prabhu et al. |
| 11,016,545 | B2 | 5/2021 | Yang et al. |
| 11,079,822 | B2 | 8/2021 | Hatch et al. |
| 2017/0060202 | A1* | 3/2017 | Sundaram ............. G06F 1/3275 |
| 2018/0129431 | A1* | 5/2018 | Yang .................. G06F 11/3034 |
| 2019/0073154 | A1* | 3/2019 | Gwin .................... G06F 3/0679 |
| 2022/0100427 | A1* | 3/2022 | Boehm ................ G06F 3/0659 |
| 2022/0365505 | A1* | 11/2022 | Yum ....................... G06F 1/206 |

* cited by examiner

*Primary Examiner* — Edward J Dudek, Jr.
(74) *Attorney, Agent, or Firm* — Michael Best & Friedrich LLP

(57) ABSTRACT

A data storage device includes a non-volatile memory device having a number of memory dies. The data storage device further includes a controller. The controller is configured to poll each of the memory dies at a first predetermined rate for a thermal status bit and determine whether the thermal status bit of at least one memory die of the number of memory dies is an active thermal status bit activated. The controller is further configured to reduce the operating performance of the at least one memory die in response to determining that the thermal status bit of the at least one memory die of the plurality of memory dies is the active thermal status bit.

20 Claims, 7 Drawing Sheets

DATA STORAGE DEVICE WITH DIE-BASED ENHANCED THERMAL MANAGEMENT

FIELD

This application relates generally to data storage devices, and more particularly, to data storage devices having memory die-based thermal management functionality to improve operational efficiencies of the data storage devices.

BACKGROUND

Data storage devices, such as solid-state drives ("SSD") generally monitor a general temperature within the data storage device, or a specific component of the data storage device, such as a controller. In response to detecting the temperature exceeding a threshold, the performance of the data storage device may be throttled to allow for a decrease in the temperature. However, this throttling of performance of the entire data storage device may result in the performance of an entire data storage device being reduced unnecessarily, such as where only the performance of specific components may need to be throttled based on their temperature. Additionally, by only monitoring a general temperature of the data storage device, throttling may not be initiated until the overall temperature of the data storage device is above the threshold, thereby requiring additional time required to reduce the temperature below the threshold.

SUMMARY

Data storage devices, such as solid-state drives, often reduce the performance of the entire device in response to an over-temperature condition being detected. This can lead to unnecessary reduction in operational efficiency in a data storage device. The concepts described herein discuss functions and devices configured to adjust the performance of a data storage device on a memory die level. This granular, die-based modification allows for thermal conditions to be addressed while also reducing the effect on operational efficiency, as described in more detail below.

One embodiment of the disclosure describes a data storage device includes a non-volatile memory device having a number of memory dies and each of the memory dies include a temperature sensor configured to monitor a data storage device includes a non-volatile memory device having a number of memory dies. The data storage device further includes a controller. The controller is configured to poll each of the memory dies at a first predetermined rate for a thermal status bit and determine whether the thermal status bit of at least one memory die of the number of memory dies is an active thermal status bit activated. The controller is further configured to reduce the operating performance of the at least one memory die in response to determining that the thermal status bit of the at least one memory die of the plurality of memory dies is the active thermal status bit.

In other embodiments, a method is described and is performed by a data storage device having a controller coupled to a non-volatile memory device, according to some embodiments. The method includes polling a number of memory dies of the non-volatile memory device for a thermal status bit and determining whether the thermal status bit of at least one memory die of the number of memory dies is an active thermal status bit. The method further includes reducing an operating performance of the at least one memory die in response to determining that the thermal status bit of the at least one memory die of the plurality of memory dies is the active thermal status bit In other embodiments a data storage device includes a non-volatile memory device having a number of memory dies and each of the memory dies include a temperature sensor configured to monitor a temperature. The data storage device further includes a controller. The controller is configured to poll each of the memory dies at a first predetermined rate for a thermal status bit and determine whether the thermal status bit of at least one memory die of the number of memory dies is an active thermal status bit. The controller is further configured to reduce the operating performance of the at least one memory die in response to determining that the thermal status bit of the at least one memory die of the plurality of memory dies is the active thermal status bit. The controller is further configured to poll the at least one memory die at a second predetermined rate in response to determining that the thermal status bit of the at least one memory die of the plurality of memory dies is the active thermal status bit and determine whether the thermal status bit of the at least one memory die of the plurality of memory dies is not the active thermal status bit. The controller further increases the operating performance of the at least one memory die to a normal operating performance in response to determining that the thermal status bit of the at least one memory die of the plurality of memory dies is not the active thermal status bit.

Various aspects of the present disclosure provide for data storage devices with die-based thermal management functionality. The present disclosure can be embodied in various forms, including hardware or circuits controlled by software, firmware, or a combination thereof. The foregoing summary is intended solely to give a general idea of various aspects of the present disclosure and does not limit the scope of the present disclosure in any way.

DETAILED DESCRIPTION

In the following description, numerous details are set forth, such as data storage device configurations, controller operations, and the like, in order to provide an understanding of one or more aspects of the present disclosure. It will be readily apparent to one skilled in the art that these specific details are merely exemplary and not intended to limit the scope of this application. In particular, the functions associated with the controller can be performed by hardware (for example, analog or digital circuits), a combination of hardware and software (for example, program code or firmware stored in a non-transitory computer-readable medium that is executed by a processor or control circuitry), or any other suitable means. The following description is intended solely to give a general idea of various aspects of the present disclosure and does not limit the scope of the disclosure in any way. Furthermore, it will be apparent to those of skill in the art that, although the present disclosure refers to NAND flash, the concepts discussed herein are applicable to other types of solid-state memory, such as NOR, PCM ("Phase Change Memory"), ReRAM, MRAM, DRAM, etc.

Figure 1:
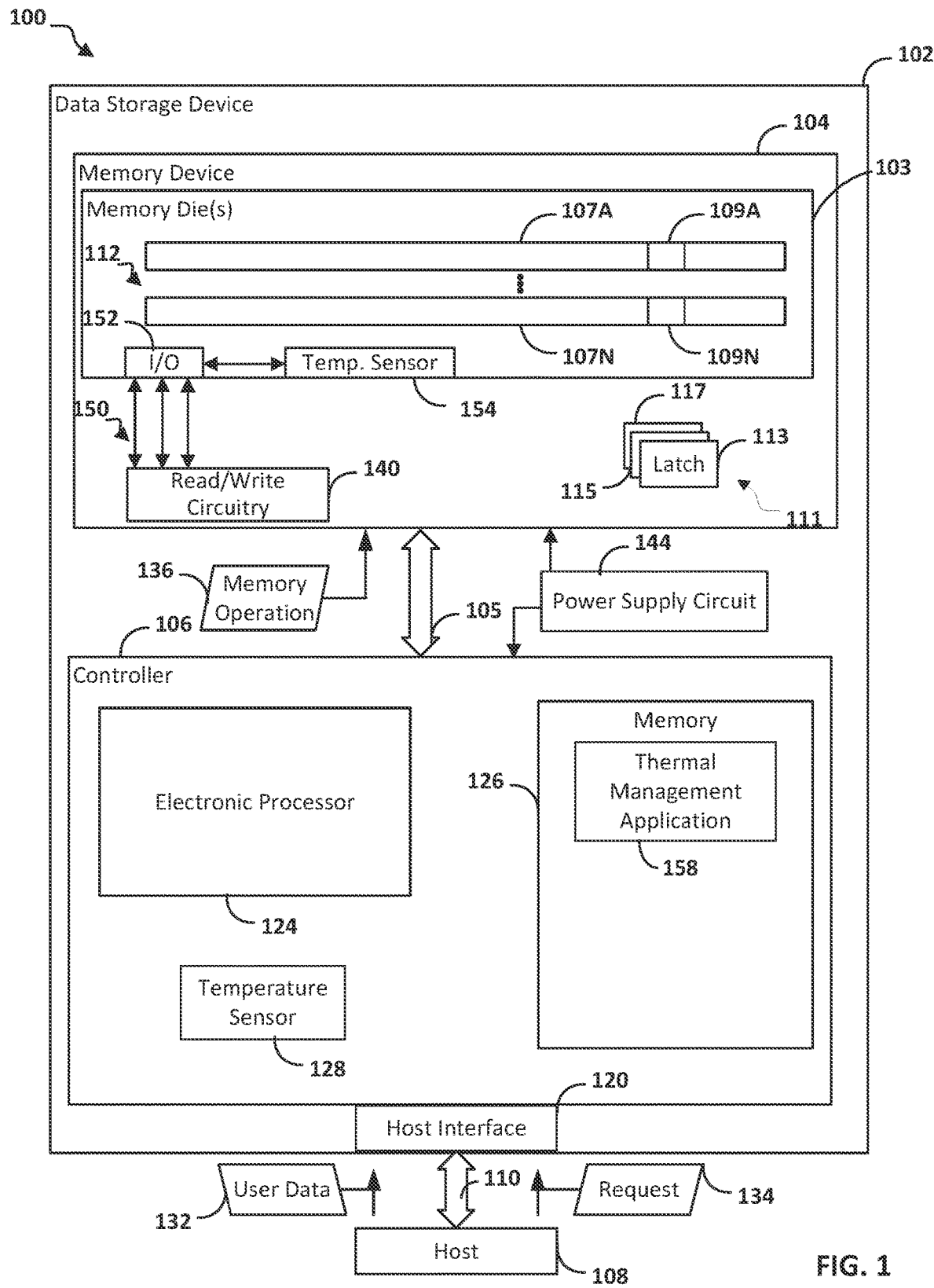
FIG. 1 is a block diagram illustrating one example of a system including a data storage device, according to some embodiments.

FIG. 1 is a block diagram of one example of a system 100 that includes various die-based thermal management enhancements. In the example of FIG. 1, the system 100 includes a data storage device 102 in communication with a host device 108. The data storage device 102 includes one or more memory devices 104 (e.g., non-volatile memory) that are coupled to a controller 106.

One example of the structural and functional features provided by the controller 106 are illustrated in FIG. 1. However, the controller 106 is not limited to the structural and functional features provided by the controller 106 in FIG. 1. The controller 106 may include fewer or additional structural and functional features that are not illustrated in FIG. 1.

The data storage device 102 and the host device 108 may be operationally coupled through a connection (e.g., a communication path 110), such as a bus or a wireless connection. In some examples, the data storage device 102 may be embedded within the host device 108. Alternatively, in other examples, the data storage device 102 may be removable from the host device 108 (i.e., "removably" coupled to the host device 108). As an example, the data storage device 102 may be removably coupled to the host device 108 in accordance with a removable universal serial bus (USB) configuration. In some implementations, the data storage device 102 may include or correspond to a solid-state drive, which may be used as an embedded storage drive (e.g., a mobile embedded storage drive), an enterprise storage drive, a client storage device, a cloud storage drive, or other suitable storage drives.

The data storage device 102 may be configured to be coupled to the host device 108 using the communication path 110, such as a wired communication path and/or a wireless communication path. For example, the data storage device 102 may include an interface 120 (e.g., a host interface) that enables communication using the communication path 110 between the data storage device 102 and the host device 108, such as when the interface 120 is communicatively coupled to the host device 108. In some examples, the host device 108 may provide power to the data storage device 102. For example, the host device 108 may provide one or more regulated voltages to the data storage device 102, such as 12 VDC, 5 VDC, 3.3 VDC, or other regulated voltage level.

The host device 108 may include a processor and a memory. The memory may be configured to store data and/or instructions that may be executable by the processor. The memory may be a single memory or may include one or more memories, such as one or more non-volatile memories, one or more volatile memories, or a combination thereof. The host device 108 may issue one or more commands to the data storage device 102, such as one or more requests to erase data at, read data from, or write data to the memory device 104 of the data storage device 102. For example, the host device 108 may be configured to provide data, such as user data 132, to be stored at the memory device 104 or to request data to be read from the memory device 104. The host device 108 may include a mobile smartphone, a music player, a video player, a gaming console, an electronic book reader, a personal digital assistant ("PDA"), a computer, such as a laptop computer or notebook computer, any combination thereof, or other suitable electronic device.

The host device 108 communicates using a memory interface that enables reading from the memory device 104 and writing to the memory device 104. In some examples, the host device 108 may operate in compliance with an industry specification, such as a Universal Flash Storage ("UFS") Host Controller Interface specification. In other examples, the host device 108 may operate in compliance with one or more other specifications, such as a Secure Digital ("SD") Host Controller specification or other suitable industry specification. The host device 108 may also communicate with the memory device 104 in accordance with any other suitable communication protocol.

The memory device 104 of the data storage device 102 may include a non-volatile memory (e.g., NAND, NOR BiCS family of memories, or other suitable memory). In some examples, the memory device 104 may be any type of flash memory. For example, the memory device 104 may be two-dimensional (2D) memory or three-dimensional (3D) flash memory. The memory device 104 may include one or more memory dies 103. In some of the embodiments, individual memory dies 103 or groups of memory dies 103 may be referred to as arrays. Each of the one or more memory dies 103 may include one or more memory blocks 112 (e.g., one or more erase blocks). Each memory block 112 may include one or more groups of storage elements, such as a representative group of storage elements 107A-107N. The group of storage elements 107A-107N may be configured as a wordline. The group of storage elements 107A-107N may include multiple storage elements (e.g., memory cells that are referred to herein as a "string"), such as a representative storage elements 109A and 109N, respectively.

The memory device 104 may include support circuitry, such as read/write circuitry 140. Although depicted as a single component, the read/write circuitry 140 may be divided into separate components of the memory device 104, such as read circuitry and write circuitry. The read/write circuitry 140 may be external to the one or more memory dies 103 of the memory device 104. Alternatively, one or more individual memory dies 103 may include corresponding read/write circuitry 140 that is operable to read from and/or write to storage elements within the individual memory die, independent of any other read and/or write operations at any of the other memory dies. For example, the read/write circuitry 140 may be configured to perform various read/write operations such as initial writing to volatile memory, array commit functions, and other functions as required for a given application. The read/write circuitry may communicate (e.g., issue read/write commands) with a memory die 103 via one or more I/O lines 150. The one or more I/O lines 150 may be coupled to an I/O bus 152 internal to the memory die 103.

The read/write circuitry 140 may further communicate with a temperature sensor 154 of the memory die 103. In some embodiments, the temperature sensor 154 may set a high-temperature bit when the temperature sensor 154 determines that the temperature of the memory die 103 exceeds a predetermined temperature threshold. An example predetermined temperature threshold may be 80° C. However, predetermined temperature thresholds of more than 80° C. or less than 80° C. are also contemplated as appropriate for a given application. In some examples, the predetermined temperature threshold may be set for each memory die 103 during manufacturing. In other examples, the predetermined temperature threshold may be set or modified during operation, such as by the controller 106 and/or the host device 108. In other examples, the temperature sensor 154 may be configured to output a temperature of the memory die 103 to the controller, such as via the I/O bus 152. The memory device 104 may further include one or more latches (e.g., a set of latches 111 including latches 113, 115, and 117).

The data storage device 102 may further include a power supply circuit 144. The power supply circuit 144 may be configured to provide power to one or more of the components of the data storage device 102, such as the memory devices 104 and/or the controller 106. In some embodiments, the power supply circuit 144 receives power from the host device 108, such as through the host interface 120, as described above. In other embodiments, the data storage device 102 may have one or more additional interfaces (not shown) for receiving one or more voltages. While the data storage device 102 is shown as having a single power supply circuit 144, more than one power supply circuit 144 may be within a data storage device, as required for a given application. For example, in some examples, the data storage device 102 may include a power supply circuit 144 for each operating voltage associated with or received by the data storage device 102, such as 12 VDC, 5 VDC, 3.3 VDC, or other operating voltage. In some embodiments, the power supply circuit 144 may further couple directly to the memory dies 103.

The controller 106 is coupled to the memory device 104 (e.g., the one or more memory dies 103) using the bus 105, an interface (e.g., interface circuitry), another structure, or a combination thereof. For example, the bus 105 may include multiple distinct channels to enable the controller 106 to communicate with each of the one or more memory dies 103 in parallel with, and independently of, communication with the other memory dies 103. In some embodiments, the controller 106 may communicate with the one or more memory dies 103 via respective read/write circuitry 140.

The controller 106 is configured to receive data and instructions from the host device 108 and to send data to the host device 108. For example, the controller 106 may send data to the host device 108 using the interface 120, and the controller 106 may receive data from the host device 108 using the interface 120. The controller 106 is configured to send data and commands (e.g., the memory operation 136, which may be a cycle operation of a memory block of the memory device 104) to the memory device 104 and to receive data from the memory device 104. For example, the controller 106 is configured to send data and a program or write command to cause the memory device 104 to store data to a specified address of the memory device 104. The write command may specify a physical address of a portion of the memory device 104 (e.g., a physical address of a word line of the memory device 104) that is to store the data, as well as a size (e.g., 2k, 4k, etc.) of the data to be written.

The controller 106 is configured to send a read command to the memory device 104 to access data from a specified address of the memory device 104. The read command may specify the physical address of a region of the memory device 104 (e.g., a physical address of a word line of the memory device 104), as well as a size (e.g., 2k, 4k, etc.) of the data to be read. The controller 106 may also be configured to send data and commands to the memory device 104 associated with background scanning operations, garbage collection operations, and/or wear-leveling operations, or other suitable memory operations.

The controller 106 may include a processor 124, a memory 126, a temperature sensor 128, and other associated circuitry. The memory 126 may be configured to store data and/or instructions that may be executable by the processor 124. The memory 126 may include a die-based thermal management application 158, among other applications, programs, etc. The die-based thermal management application 158 may be configured to perform one or more actions to adjust the performance (e.g., speed and quantity of read/write operations) of individual memory dies 103, as will be described in more detail below. While shown as being stored in the memory 126, in some examples the die-based thermal management application may be configured as a circuit within the memory device 104.

Figure 2A:
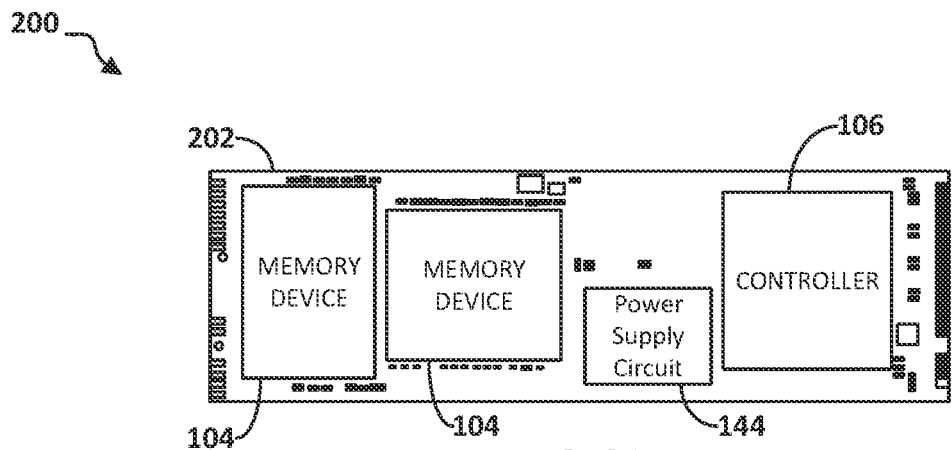
FIGS. 2A-2B are a physical diagram of the data storage device of FIG. 1, according to some embodiments.
Figure 2B:
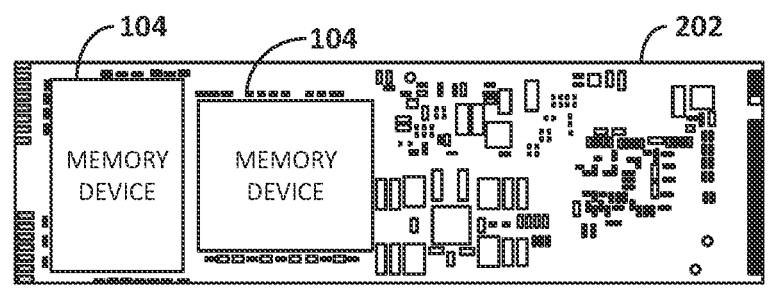

Turning now to FIGS. 2A and 2B, a physical diagram 200 of the data storage device 102 is shown, according to some embodiments. FIG. 2A shows a top view of the data storage device 102 and FIG. 2B shows a bottom view of the data storage device 102. As shown in FIGS. 2A-2B, various components of the data storage device 102 are located on a substrate 202, which may be a printed circuit board. Various components, such as memory devices 104 may be located on the substrate 202 as shown in FIGS. 2A-2B. As shown in FIGS. 2A-2B, memory devices 104 may be located on both a top side of the substrate 202 and a bottom side of the substrate 202. The data storage device 102 may further include the power supply circuit 144 and the controller 106 positioned on the substrate 202. The structure and layout of the data storage device 102 is for illustrative purposes, and it is understood that various layouts, component types, component quantities, and the like are contemplated as required for a given application.

Figure 3:
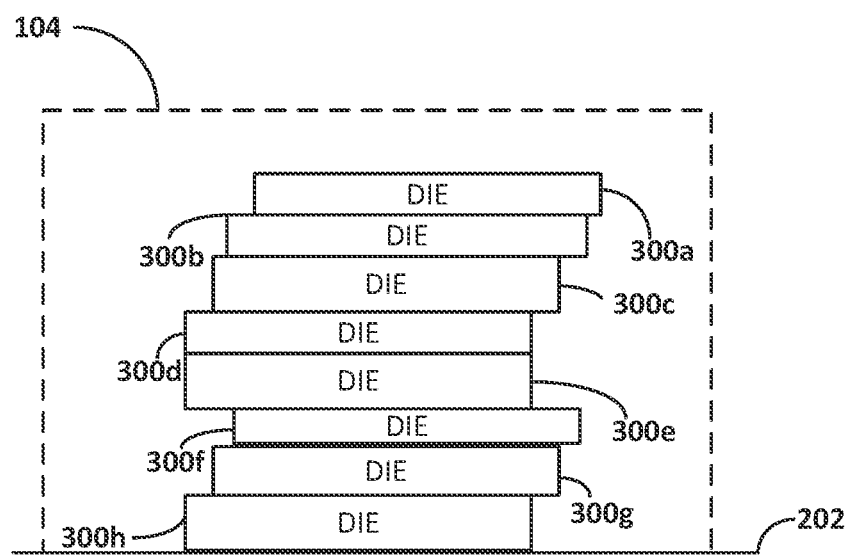
FIG. 3 is a cross-sectional view of a memory device of the data storage device of FIG. 1, according to some embodiments.

Turning now to FIG. 3, a cross-sectional view of the memory devices 104 is shown, according to some embodiments. As shown in FIG. 3, the memory device 104 includes eight memory dies 300a-h. The memory dies 300a-h may be the same as memory dies 103, described above. While shown as having 8 memory dies 300a-h, the memory device 104 may include more than 8 memory dies or less than 8 memory dies, as required for a given application. For examples, the memory device may have 16 dies, 32 dies, 64 dies, 128 dies, 256 dies, etc. Each of the memory dies 300a-h may be 500-megabyte memory dies, 1 terabyte memory dies, or other value as appropriate for a given application.

As shown in FIG. 3, the memory dies 300a-h are stacked atop each other in a staggered formation. This stacking may result in some memory dies 300a-h increasing in temperature more than other memory dies in the same stack. For example, memory dies 300d and 300e may increase in temperature during operation faster than memory dies 300a and 300h. This is due to the fact that the memory dies, such as memory dies 300d and 300e are surrounded by other memory dies, which may limit their ability to dissipate heat as effectively. However, in some examples, other factors may affect the thermal characteristics of a memory dies, such as construction, data access rates (e.g., more reads/writes to a specific memory die may lead to an increase in temperature), etc., may further increase the temperature of a specific memory die.

Figure 4:
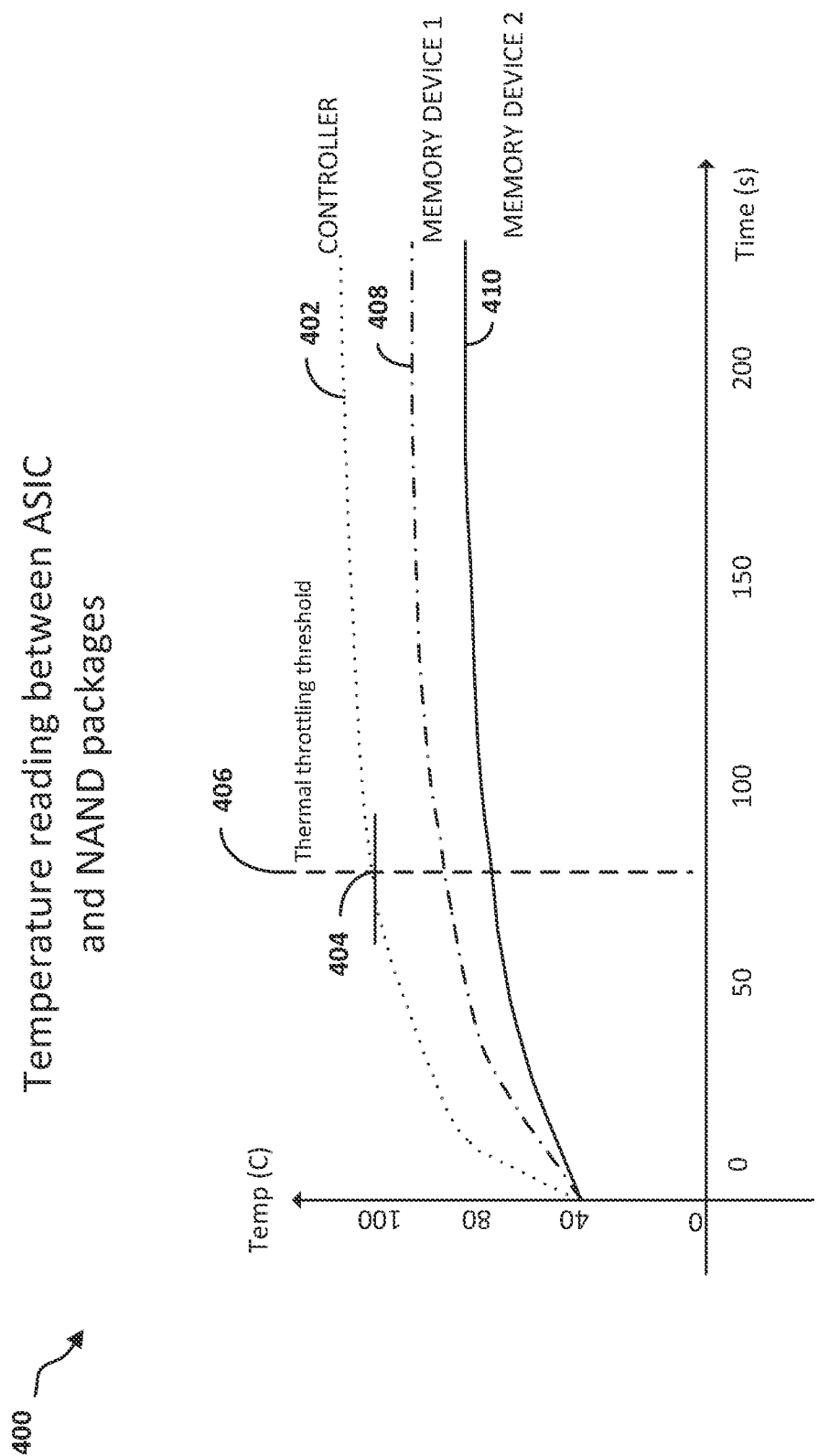
FIG. 4 is a graph illustrating general temperature rises over time for a data storage device, according to some embodiments.

As noted above, in some data storage devices, a temperature of the controller, such as controller 106 may be used to control various thermal management operations for the data storage device, such as throttling (i.e., reducing) performance of the data storage device as a whole. However, the controller temperature may not be representative of the temperature of the memory devices within the data storage device. This can be seen in FIG. 4, which provides a thermal management plot 400 showing an increase in temperature over time for a controller, such as controller 106, as well as two memory devices, such as memory devices 104, described above. Data line 402 shows the temperature of the controller 106, which exceeds a thermal throttling threshold 404 at time 406. However, at time 406, the temperature of both the memory devices are below the thermal throttling threshold, as shown by data lines 408 and 410. In this example, the controller 106 may throttle operation of the data storage device 102. For example, the controller 106 may reduce an interface ("IF") speed by approximately 50%. However, reductions of more than 50% or less than 50% are also contemplated as appropriate for a given application. The IF speed is the speed at which data may be written to or read from a host device, such as host device 108. In some examples, the IF speed may be referred to as a read/write speed or an operating speed. In some examples, the controller temperature may be a general temperature of the data storage device as detected by one or more temperature sensors, such as temperature sensor 128, thereby again basing any performance throttling on a general temperature within a data storage device, such as data storage device 102. The processes described below function to attempt to allow for more granular thermal management of a data storage device, such as by throttling individual memory dies.

Figure 5:
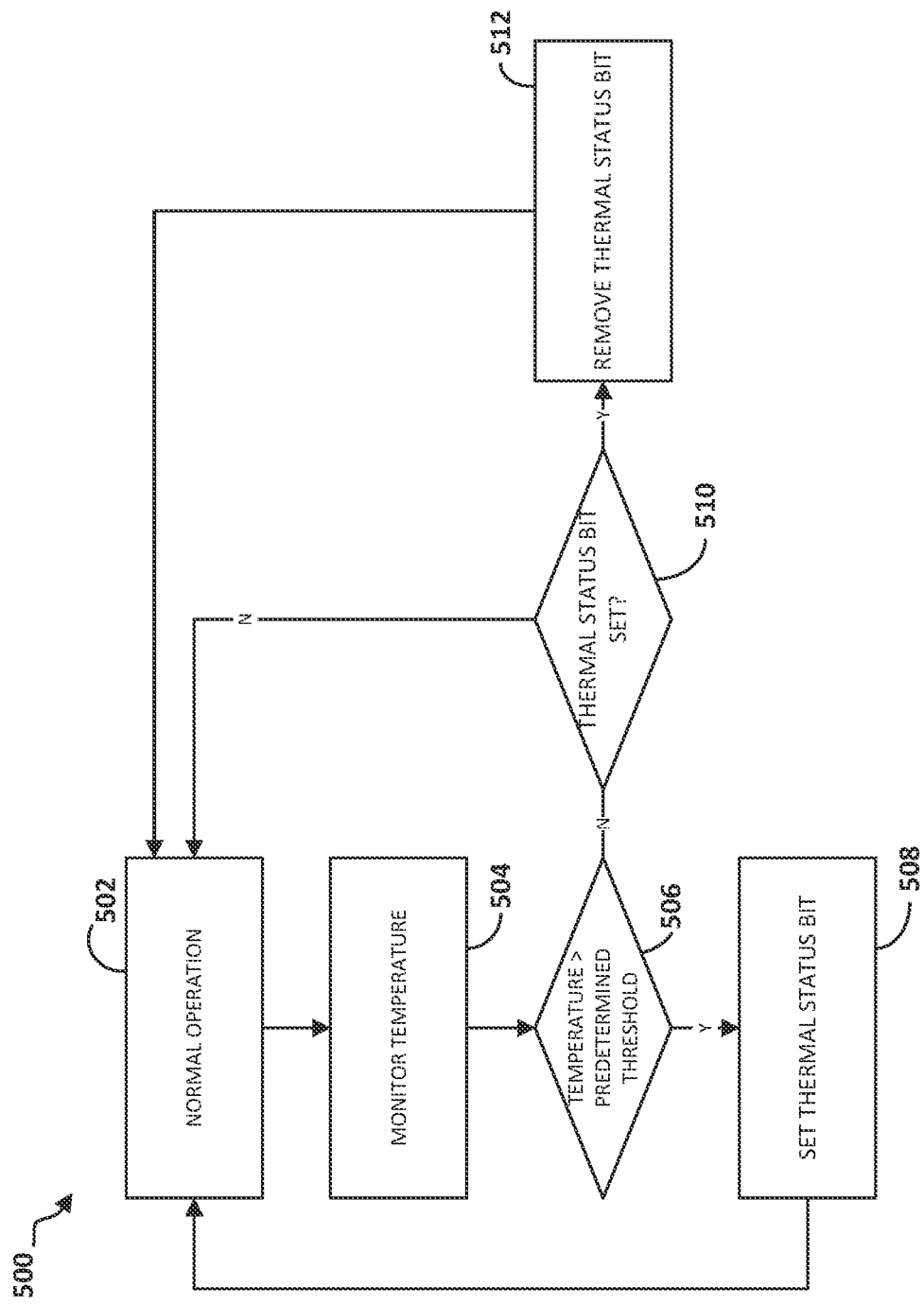
FIG. 5 is a flow chart illustrating a process for thermal monitoring of a memory die, according to some embodiments.

Turning now to FIG. 5, a process 500 for thermal monitoring of a memory die, such as memory die 103 is described, according to some embodiments. The process 500 is described as being performed by the data storage device 102 as described above. At process block 502, the memory die 103 operates normally. Normal operation may include allowing the controller 106 to read data to and/or write data to the memory die 103 at a normal or designed IF speed. At process block 504, the memory die 103 monitors a temperature of the memory die. In one embodiment, the temperature sensor 154 monitors the temperature of the memory die 103. At process block 506, the memory die 103 determines whether the monitored temperature exceeds a predetermined threshold. As described above, the predetermined threshold may be set during manufacturing or during an installation. In one embodiment, the predetermined threshold is 80° C. However, values of more than 80° C. or less than 80° C. are also contemplated.

In response to determining that the monitored temperature exceeds the predetermined threshold, a thermal status bit is set or activated at process block 508. The thermal status bit may indicate that the temperature of the memory die 103 is exceeding the predetermined value. The thermal status bit may be provided to the I/O bus 152, which may be read by the controller 106, such as via the read/write circuitry 140. The memory die 103 then continues normal operation at process block 502. In response to determining that the temperature is not greater than the predetermined threshold at process block 506, the memory die 103 determines whether the thermal status bit is set at process block 510. In response to the thermal status bit not being set, the memory die 103 continues normal operation at process block 502. In response to determining that the thermal status bit is set, the thermal status bit is removed or "unset" at process block 512. The memory die 103 then continues with normal operation at process block 502.

Figure 6:
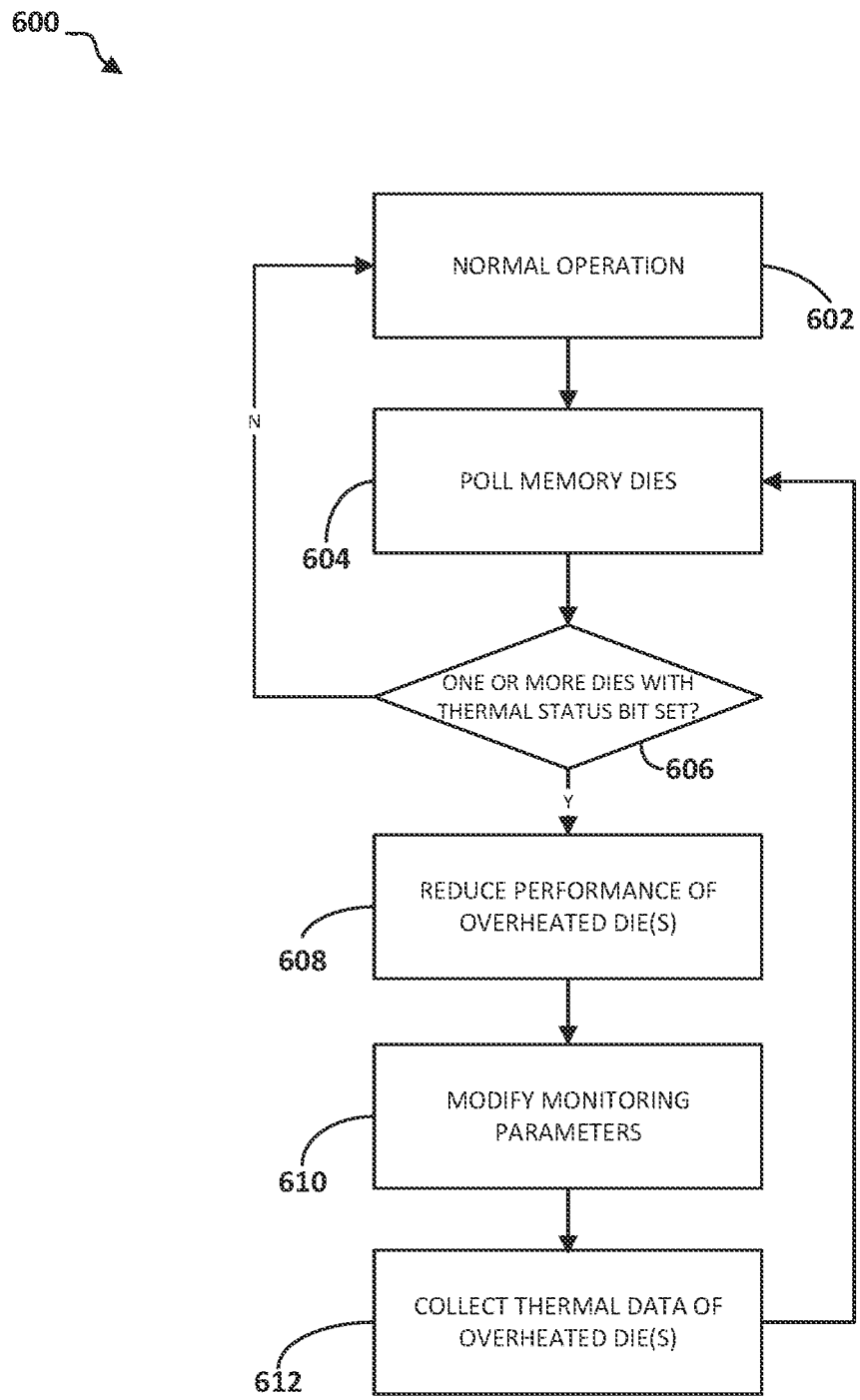
FIG. 6 is a flow chart illustrating a process for die-level thermal management of a data storage device.

Turning now to FIG. 6, a process 600 for die-level thermal management of a data storage device, such as data storage device 102, is shown, according to some embodiments. In one embodiment, a controller, such as controller 106 described above, is configured to execute the process 600. For example, the electronic processor 124 may execute one or more programs within the memory 126, such as the thermal management application 158, as described above, to perform the process 600.

At process block 602, the data storage device 102 operates normally. Normal operation may include operating the one or more memory devices 104 of the data storage device at their normal IF speed, and specifically with no performance reduction measures in place.

At process block 604, the controller 106 polls the one or more memory dies 103 within the memory devices 104. Polling the memory dies may include polling one or more data bits of the memory dies, such as the thermal status bits described above. In some embodiments, the memory dies 103 may be polled at a predefined rate, such as every one second. However, polling rates of more than one second or less than one second are also contemplated as required for a given application. In some examples, the controller 106 may poll the memory dies 103 via the read/write circuitry 140.

At process block 606, the controller 106 determines whether one or more memory dies 103 have their thermal status bit set and/or activated. As described above with respect to FIG. 5, the memory dies 103 may set their thermal status bit when a temperature of the memory die 103 exceeds a predetermined threshold. In response to determining that none of the thermal status bits are set within the memory dies 103, the controller 106 continues operating the data storage device 102 normally at process block 602.

In response to determining that one or more memory dies 103 have their thermal status bits set, the controller 106 reduces the performance of the one or more memory dies 103 having active thermal bits at process block 608. In one embodiment, reducing the performance of a memory die 103 may include reducing the IF speed of the respective memory dies 103 with active thermal status bits. Reducing the IF speed of a memory die 103 reduces the speed at which read and/or write operations are performed on the memory die 103. In other examples, the performance of a memory die 103 may be reduced by reducing a clocking frequency of the memory die, adding dummy cycles to the operation to extend a non-operation time of a memory die 103, and/or other operations to cause a reducing in performance of the memory die 103 as appropriate for a given application. In some embodiments, the controller 106 may directly control the performance reduction of a memory die 103, such as by reducing the clocking frequency and/or reducing an IF speed. In other examples, the controller 106 may provide an instruction to the memory die 103 to reduce performance, resulting in the memory die 103 performing the various operations to reduce performance. In still other examples, a memory die 103 may be configured to automatically reduce its own performance upon setting the thermal status bit without intervention by the controller 106.

Figure 7:
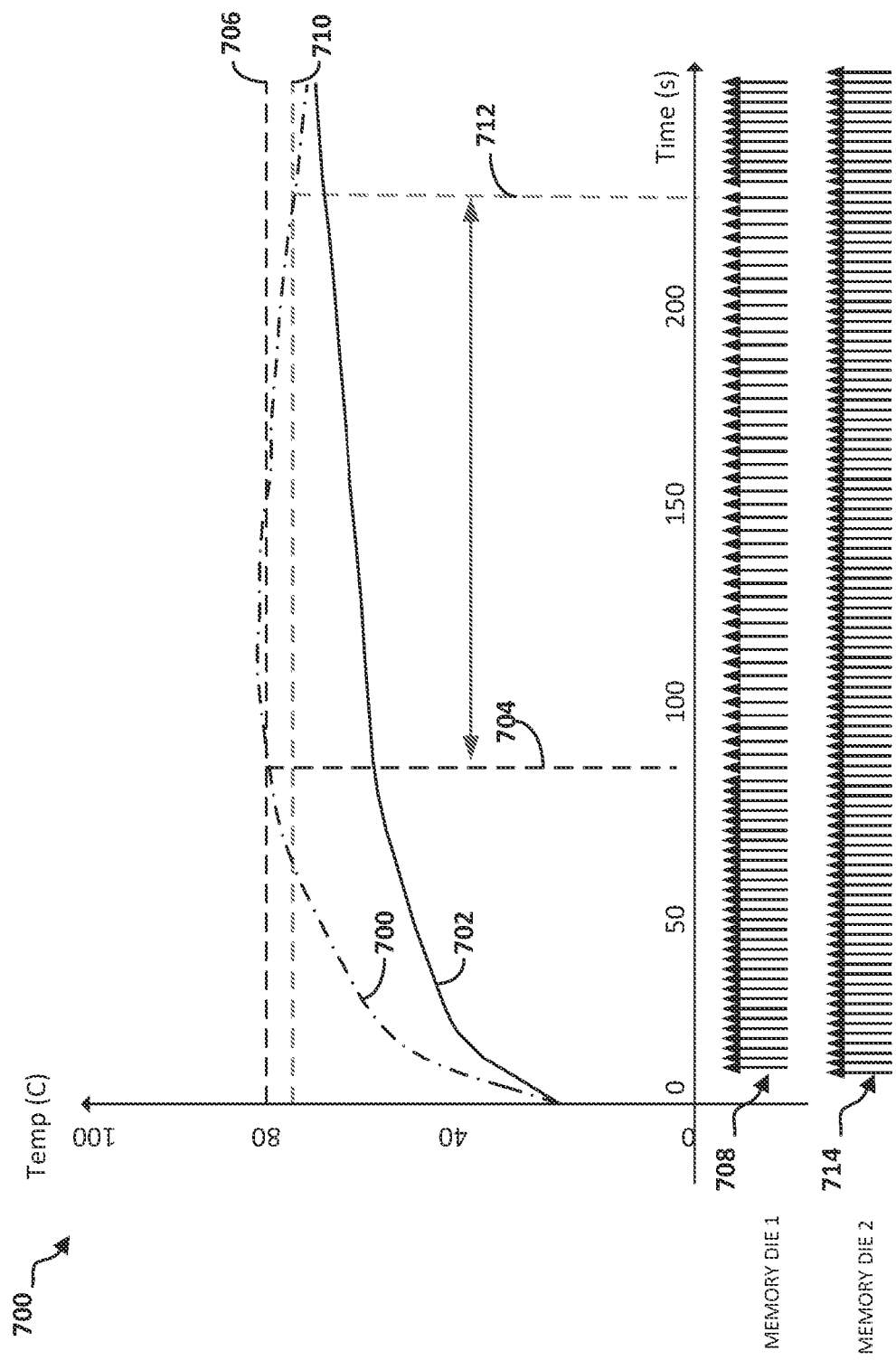
FIG. 7 is a graph illustrating a thermal response of two separate memory dies during a die-level thermal management operation, according to some embodiments.

This reduction in performance of a memory die 103 is configured to reduce an energy consumption by the memory die 103, thereby reducing the thermal load of the memory die 103. This is shown in FIG. 7, which is a graph illustrating a thermal response of two separate memory dies, such as memory dies 103, within a data storage device, such as data storage device 102. A temperature of a first memory die 700 and a second memory die 702 are shown in FIG. 7. At time period 704, the temperature of the first memory die 700 exceeds the thermal threshold 706. The performance of the first memory die 700 is then slowed at time period 704, which is shown in the performance output 708 for the first memory die 700. The reduction in performance results in the temperature of the first memory die 700 gradually being reduced until crossing the lower thermal threshold 710 at time 712, at which time the first memory die 700 resumes normal performance and no longer sets the thermal status bit. In contrast, the temperature of the second memory die 702 never exceeds the thermal threshold 706, and therefore the performance of the second memory die 702 is not reduced, as shown in the performance output 714 of the second memory die 702.

Returning now to FIG. 6, upon reducing the performance of the one or more memory dies 103, the controller modifies monitoring parameters at process block 610 for one or more memory dies 103. Modifying the monitoring parameters may include decreasing the polling time of the memory dies 103 with the set thermal status bits to poll the respective memory dies 103 more frequently. In some examples, the controller 106 may determine one or more memory dies 103 in proximity to the memory dies 103 having the set thermal status bit and decreasing the polling time for those memory dies 103 as well. This can help to account for additional heating of the adjacent memory dies 103 due to the increased temperature of the memory dies 103 with the set thermal bit (e.g., experiencing an overheating condition). In some embodiments, the controller 106 may take preventative measures with respect to memory dies 103 adjacent to the overheating memory dies 103, such as lowering IF speed, etc. to prevent overheating of the adjacent memory dies 103.

At process block 612, the controller 106 stores the data associated with a determined overheating event, such as duration of the event, the location of the affected memory dies 103, the performance reduction operations taken, adjacent memory dies, and the like. This information may be used to modify the operation and/or thermal management of the data storage device 102, as will be described in more detail below. In some examples, the stored data may be provided to a central server or other external device for further analysis. For example, the controller 106 may communicate the information to other devices, such as via the host device 108. The controller 106 then continues to poll the memory dies 103 at process block 604. Accordingly, when the temperature of the one or more memory dies 103 with the set thermal status bit fall below a predetermined threshold, the thermal status bit will no longer be set, and the respective memory dies 103 will resume normal operation at process block 602.

By modifying performance at the memory die level, the overall effect of overheating on the data storage device 102 is reduced. Specifically, in current data storage devices, such as an SSD, the overall performance of the data storage device may be reduced based on an overheating event in current designs. For example, the overall performance of a data storage device may be reduced by 50% in response to an overtemperature event taking place. In contrast, by reducing performance of specific memory dies 103 that are experiencing overheating events, the overall effect on the performance of the data storage device 102 is substantially reduced. For example, a data storage device, such as data storage device 102, may include multiple memory dies 103, such as 16, 32, 64, 128, or 256 within a single package. Taking a data storage device having 128 memory dies, each individual die is responsible for approximately 0.8% of the total operating capacity. Thus, a reduction of performance of a single die (for example, a 50% reduction in IF speed) will only account for approximately a 0.4% decrease in performance for the data storage device in general. Even in a data storage device with 32 memory dies, the reduction in performance of a single memory die (for example, a 50% reduction in IF speed) would result in only about a 1.5% reduction in performance for the data storage device 102. Thus, the process 600 can effectively address thermal issues on a memory die-level to limit the overall reduction of performance of the data storage device 102.

Figure 8:
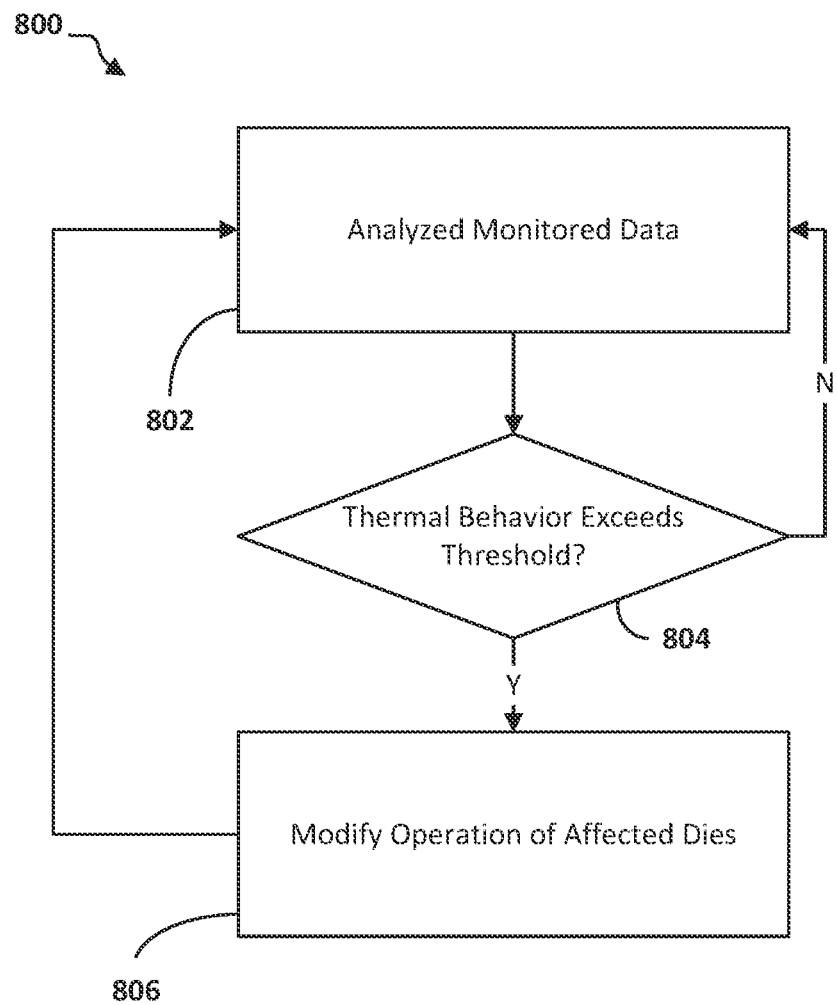
FIG. 8 is a flow chart illustrating a process for modifying a thermal performance of a data storage device, according to some embodiments.

Turning now to FIG. 8, a process 800 for modifying thermal performance of a data storage device, such as data storage device 102 is shown, according to some embodiments. In some embodiments, the process 800 may be performed by the controller 106. In other embodiments, the process 800 may be executed on an external device, such as a central server or other supervisory system, in conjunction with the controller 106.

At process block 802, thermal data for the data storage device 102 is analyzed. The thermal data may be data stored and collected by the controller 106 over time, such as described above with respect to FIG. 6. In one example, the controller 106 analyzes the thermal data to determine thermal behavior of one or more memory dies 103 within a data storage device 102. However, in other examples, an external device as described above may perform the analysis. For example, the controller 106 may transmit the collected thermal data to a host device, such as host device 108. In one example, the controller 106 may transmit the collected thermal data to the host device 108 in a log file. However, other file types are also contemplated as appropriate for a required application. The host device 108, and/or other external device may then analyze the thermal data using analytical techniques. In one embodiment, the thermal data may include thermal data related to specific memory dies 103 within the data storage device 102.

Specifically, various analytical techniques may be used to analyze the thermal data, such as machine learning, artificial intelligence ("AI"), statistical analysis, and/or other analysis techniques as appropriate for a given application. The analysis of the thermal data may allow for a manufacturer or system operator to modify air flow within a system (e.g., a server system), improve heat transfer from specific memory dies 103 and/or memory device 104 within a data storage device 102, such as by varying placement, adding or modifying heat sinks, and/or varying other heat dissipation elements within the data storage device 102.

At process block 804, it is determined whether the thermal behavior exceeds a threshold value. The threshold value may be based on multiple data points, such as a number of times a thermal status bit of a memory die 103 is set, the duration in which it remains set, the effects of temperatures on adjacent dies, the location of the affected memory dies 103, the general operations performed by the affected memory dies 103 (e.g., high density write operations, frequent read operations, etc.) and/or other data as appropriate for a given application. In response to the thermal behavior not exceeding a threshold, the monitored data is continuously analyzed at process block 802.

In response to determining that the thermal behavior exceeds the threshold, one or more operations of the data storage device 102 and/or one or more memory dies 103 within the data storage device 102 are modified. Modification of the operations may include increasing the frequency of temperature checks of specific memory dies. Other example modifications may include modifying the thermal threshold for specific memory dies 103 such that the thermal status bit will not be set until the temperature exceeds a greater threshold. This may allow for certain memory dies to increase above a standard temperature threshold (e.g., 80° C.) before performance reduction of the memory die 103 is instituted. Other modifications may include modifying the controller to avoid sending critical system data (e.g., file systems, flash translation layer ("FTL") tables, etc.) to memory dies 103 which experience higher temperatures resulting in performance reductions. Still other modifications may include storing more stagnant or cold data to memory dies 103 which experience higher temperatures resulting in performance reductions. Additional modifications may include reduction in data traffic to specific memory dies 103 during sequential programming and/or reduction in read access (where allowed) of specific memory dies during sequential read operations.

After modifying the operation of the data storage device 102 and/or memory dies 103, the monitored data continues to be analyzed at process block 802 for possible additional modifications over time.

While the above systems, devices, processes, etc., have been described with respect to a data storage device, it is contemplated that other electronic devices, such as cellular phones, tablet computers, laptops, etc., may utilize one or more of the concepts described herein for monitoring one or more power supplies for an over-voltage condition.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain implementations and should in no way be construed to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A data storage device, comprising:
   a non-volatile memory device including a plurality of memory dies, wherein each of the plurality of memory dies include;
   a controller configured to:
   poll each of the plurality of memory dies at a first predetermined rate for a thermal status bit;
   determine whether the thermal status bit of at least one memory die of the plurality of memory dies is an active thermal status bit;
   reduce an operating performance of the at least one memory die in response to determining that the thermal status bit of the at least one memory die of the plurality of memory dies is the active thermal status bit;
   poll the at least one memory die at a second predetermined rate; and
   determine whether the thermal status bit of the at least one memory die of the plurality of memory dies is not the active thermal status bit.

2. The data storage device of claim 1, wherein the controller is further configured to:
   increase the operating performance of the at least one memory die to a normal operating performance in response to determining that the thermal status bit of the at least one memory die of the plurality of memory dies is not the active thermal status bit.

3. The data storage device of claim 2, wherein the controller is further configured to:
   maintain polling the one or more memory dies adjacent to the at least one memory die at the second predetermined rate in response to determining the thermal status bit of the at least one memory die of the plurality of memory dies is the active thermal status bit.

4. The data storage device of claim 2, wherein the second predetermined rate is a faster rate than the first predetermined rate.

5. The data storage device of claim 1, wherein reducing the operating performance of the at least one memory die includes reducing an interface speed of the at least one memory die.

6. The data storage device of claim 5, wherein reducing the interface speed is a reduction of 50%.

7. The data storage device of claim 1, wherein the plurality of memory dies are configured to activate the thermal status bit in response to a temperature sensor within the plurality of memory dies determining that a sensed temperature exceeds a predetermined threshold.

8. The data storage device of claim 7, wherein the predetermined threshold is 80° C.

9. A method performed by a data storage device having a controller coupled to a non-volatile memory device, the method comprising:
   polling a plurality of memory dies of the non-volatile memory device for a thermal status bit at a first predetermined rate;

determining whether the thermal status bit of at least one memory die of the plurality of memory dies is an active thermal status bit;

reducing an operating performance of the at least one memory die in response to determining that the thermal status bit of the at least one memory die of the plurality of memory dies is the active thermal status bit;

polling the at least one memory die at a second predetermined rate; and determining whether the thermal status bit of the at least one memory die of the plurality of memory dies is not the active thermal status bit.

10. The method of claim 9, further comprising:

increase the operating performance of the at least one memory die to a normal operating performance in response to determining that operating performance of the at least one memory die to a normal operating performance in response to determining that the thermal status bit of the at least one memory die of the plurality of memory dies is not the active thermal status bit.

11. The method of claim 10, further comprising maintaining polling one or more memory dies adjacent to the at least one memory die at the second predetermined rate in response to determining the thermal status bit of the at least one memory die of the plurality of memory dies is the active thermal status bit.

12. The method of claim 10, wherein the second predetermined rate is a faster rate than the first predetermined rate.

13. The method of claim 9, wherein reducing the operating performance of the at least one memory die includes reducing an interface speed of the at least one memory die.

14. The method of claim 13, wherein reducing the interface speed is a reduction of 50%.

15. The method of claim 9, wherein the plurality of memory dies each include a temperature sensor configured to activate the thermal status bit in response to a temperature monitored by the temperature sensor exceeding a predetermined threshold.

16. The method of claim 15, wherein the predetermined threshold is 80° C.

17. A data storage device, comprising:

a non-volatile memory device including a plurality of memory dies, wherein each of the plurality of memory dies include a temperature sensor configured to monitor a temperature; and a controller configured to:
poll each of the plurality of memory dies at a first predetermined rate for a thermal status bit;

determine whether the thermal status bit of at least one memory die of the plurality of memory dies is an active thermal status bit;

reduce an operating performance of the at least one memory die in response to determining that the thermal status bit of the at least one memory die of the plurality of memory dies is the active thermal status bit;

poll the at least one memory die at a second predetermined rate in response to determining that the thermal status bit of the at least one memory die of the plurality of memory dies is the active thermal status bit;

determine whether the thermal status bit of the at least one memory die of the plurality of memory dies is not the active thermal status bit; and increase the operating performance of the at least one memory die to a normal operating performance in response to determining that the thermal status bit of the at least one memory die of the plurality of memory dies is not the active thermal status bit.

18. The data storage device of claim 17, wherein the second predetermined rate is a faster rate than the first predetermined rate.

19. The data storage device of claim 17, wherein reducing the operating performance of the at least one memory die includes reducing an interface speed of the at least one memory die.

20. The data storage device of claim 17, wherein the controller is further configured to:
record thermal data for the at least one memory die; and
output the recorded thermal data to an external device.

* * * * *